(12) United States Patent
Rice et al.

(10) Patent No.: US 8,169,746 B1
(45) Date of Patent: May 1, 2012

(54) INTEGRATED LEAD SUSPENSION WITH MULTIPLE TRACE CONFIGURATIONS

(75) Inventors: Alexander J. Rice, Hutchinson, MN (US); Gregory J. VanHecke, Dassel, MN (US); Reed T. Hentges, Buffalo, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 1047 days.

(21) Appl. No.: 12/099,523

(22) Filed: Apr. 8, 2008

(51) Int. Cl.
*G11B 5/48* (2006.01)
*G11B 21/16* (2006.01)

(52) U.S. Cl. ..................... 360/245.9; 360/246
(58) Field of Classification Search ............... 360/245.8, 360/245.9, 246
See application file for complete search history.

(56) References Cited

U.S. PATENT DOCUMENTS

| | | | |
|---|---|---|---|
| 3,320,556 A | 5/1967 | Schneider |
| 5,140,288 A | 8/1992 | Grunwell |
| 5,427,848 A | 6/1995 | Baer et al. |
| 5,598,307 A | 1/1997 | Bennin |
| 5,608,591 A | 3/1997 | Klaassen |
| 5,631,786 A | 5/1997 | Erpelding |
| 5,666,717 A | 9/1997 | Matsumoto et al. |
| 5,694,270 A | 12/1997 | Sone et al. |
| 5,717,547 A | 2/1998 | Young |
| 5,737,152 A | 4/1998 | Balakrishnan |
| 5,796,552 A | 8/1998 | Akin, Jr. et al. |
| 5,805,382 A | 9/1998 | Lee et al. |
| 5,862,010 A | 1/1999 | Simmons et al. |
| 5,924,187 A | 7/1999 | Matz |
| 5,986,853 A | 11/1999 | Simmons et al. |
| 5,995,328 A | 11/1999 | Balakrishnan |
| 6,038,102 A | 3/2000 | Balakrishnan et al. |
| 6,146,813 A | 11/2000 | Girard et al. |
| 6,275,358 B1 | 8/2001 | Balakrishnan et al. |
| 6,300,846 B1 | 10/2001 | Brunker |
| 6,399,899 B1 | 6/2002 | Ohkawa et al. |
| 6,404,594 B1 | 6/2002 | Maruyama et al. |
| 6,424,500 B1 | 7/2002 | Coon et al. |
| 6,493,190 B1 | 12/2002 | Coon |
| 6,596,184 B1 | 7/2003 | Shum et al. |
| 6,714,384 B2 | 3/2004 | Himes et al. |
| 6,714,385 B1 | 3/2004 | Even et al. |
| 6,728,057 B2 | 4/2004 | Putnam |
| 6,737,931 B2 | 5/2004 | Amparan et al. |
| 6,762,913 B1 | 7/2004 | Even et al. |
| 6,798,597 B1 | 9/2004 | Aram et al. |
| 6,801,402 B1 | 10/2004 | Subrahmanyam et al. |

(Continued)

FOREIGN PATENT DOCUMENTS

EP 834867 4/2008

(Continued)

*Primary Examiner* — Jefferson Evans
(74) *Attorney, Agent, or Firm* — Faegre Baker Daniels LLP

(57) ABSTRACT

An integrated lead head suspension flexure includes a mounting region, a gimbal extending distally from the mounting region and having bond pads, and a tail extending proximally from the mounting region and having terminal pads. First trace sections having a first structural configuration, such as interleaved traces, are electrically connected to the terminal pads and extend across the tail and mounting region. Second trace sections having a second structural configuration different than the first structural configuration, such as ground plane traces, are electrically connected to the bond pads and extend across the gimbal. Transition structures electrically connect the first trace sections to the second trace sections. The first and second trace sections impedance match the different impedances at the bond pads and terminal pads.

17 Claims, 10 Drawing Sheets

U.S. PATENT DOCUMENTS

| | | | |
|---|---|---|---|
| 6,839,204 B2 | 1/2005 | Shiraishi et al. | |
| 6,841,737 B2 | 1/2005 | Komatsubara et al. | |
| 6,900,967 B1 | 5/2005 | Coon et al. | |
| 6,942,817 B2 | 9/2005 | Yagi et al. | |
| 6,963,471 B2 | 11/2005 | Arai et al. | |
| 6,975,488 B1 | 12/2005 | Kulangara et al. | |
| 7,020,949 B2 | 4/2006 | Muramatsu et al. | |
| 7,079,357 B1 | 7/2006 | Kulangara et al. | |
| 7,092,215 B2 | 8/2006 | Someya et al. | |
| 7,132,607 B2 | 11/2006 | Yoshimi et al. | |
| 7,144,687 B2 | 12/2006 | Fujisaki et al. | |
| 7,161,767 B2 | 1/2007 | Hernandez et al. | |
| 7,271,958 B2 * | 9/2007 | Yoon et al. | 359/572 |
| 7,382,582 B1 | 6/2008 | Cuevas | |
| 7,643,252 B2 | 1/2010 | Arai et al. | |
| 7,667,921 B2 | 2/2010 | Satoh et al. | |
| 7,675,713 B2 | 3/2010 | Ogawa et al. | |
| 7,692,899 B2 | 4/2010 | Arai et al. | |
| 7,701,673 B2 | 4/2010 | Wang et al. | |
| 7,701,674 B2 | 4/2010 | Arai | |
| 7,724,478 B2 | 5/2010 | Deguchi et al. | |
| 7,923,644 B2 * | 4/2011 | Ishii et al. | 174/254 |
| 8,004,798 B1 * | 8/2011 | Dunn | 360/245.8 |
| 2003/0053258 A1 | 3/2003 | Dunn et al. | |
| 2004/0070884 A1 * | 4/2004 | Someya et al. | 360/245.9 |
| 2005/0061542 A1 | 3/2005 | Aonuma et al. | |
| 2005/0063097 A1 | 3/2005 | Maruyama et al. | |
| 2005/0254175 A1 | 11/2005 | Swanson et al. | |
| 2005/0280944 A1 * | 12/2005 | Yang et al. | 360/245.9 |
| 2007/0133128 A1 | 6/2007 | Arai | |
| 2007/0253176 A1 * | 11/2007 | Ishii et al. | 361/760 |
| 2008/0192384 A1 | 8/2008 | Danielson et al. | |
| 2008/0273266 A1 | 11/2008 | Pro | |
| 2008/0273269 A1 | 11/2008 | Pro | |

FOREIGN PATENT DOCUMENTS

| | | |
|---|---|---|
| JP | 09-198825 | 7/1997 |
| JP | 10-003632 | 1/1998 |
| JP | 2001-202731 | 7/2001 |
| JP | 2004-039056 | 2/2004 |

* cited by examiner

INTEGRATED LEAD SUSPENSION WITH MULTIPLE TRACE CONFIGURATIONS

TECHNICAL FIELD

The invention is an integrated lead or wireless head suspension flexure of the type used in disk drive data storage systems.

BACKGROUND

Integrated lead or wireless suspensions and flexures of the type used to support read/write heads in disk drive data storage systems are known and disclosed, for example, in Japanese patent publication JP 10003632 and the following U.S. patents.

| Inventor | U. S. Pat. No. |
| --- | --- |
| Klaassen | 5,608,591 |
| Akin, Jr. et al. | 5,796,552 |
| Simmons et al. | 5,862,010 |
| Matz | 5,924,187 |
| Coon et al. | 6,424,500 |
| Putnam | 6,728,057 |
| Coon et al. | 6,900,967 |
| Kulangara et al. | 6,975,488 |
| Someya et al. | 7,092,215 |
| Yoshimi et al. | 7,132,607 |
| Fujisaki et al. | 7,144,687 |
| Hernandez et al. | 7,161,767 |

The continuing evolution of disk drive technology requires increasingly smaller head suspensions with enhanced mechanical and electrical performance specifications. There is, therefore, a continuing need for improved integrated lead suspensions and flexures. In particular, there is a need for suspensions and flexures with traces having high bandwidth and low impedance electrical characteristics along with low stiffness and small footprint mechanical properties. Suspensions and flexures of these types with traces that match the different impedances of the preamplifier and write head to which they are connected would be especially desirable. To be commercially viable any such components should also be efficient to manufacture.

SUMMARY

The invention is an integrated lead flexure having traces with enhanced electrical and mechanical properties. In particular, the components can have low impedance and high bandwidth electrical characteristics and low stiffness and small footprint mechanical characteristics. The traces can also be configured to impedance match the preamplifier and write heads to which they are connected.

An integrated lead head suspension flexure in accordance with one embodiment of the invention has a plurality of regions including a tail and a gimbal. First trace sections having a first structural configuration are on a first region such as the tail. Second trace sections having a second structural configuration different than the first configuration are on the second region such as the gimbal. The second trace sections are electrically connected to the first trace sections. Trace configurations that can be incorporated into the flexure include interleaved traces, stacked traces and ground plane traces. In another embodiment of the invention the first and second trace sections are substantially impedance matched.

DETAILED DESCRIPTION

Figure 1:
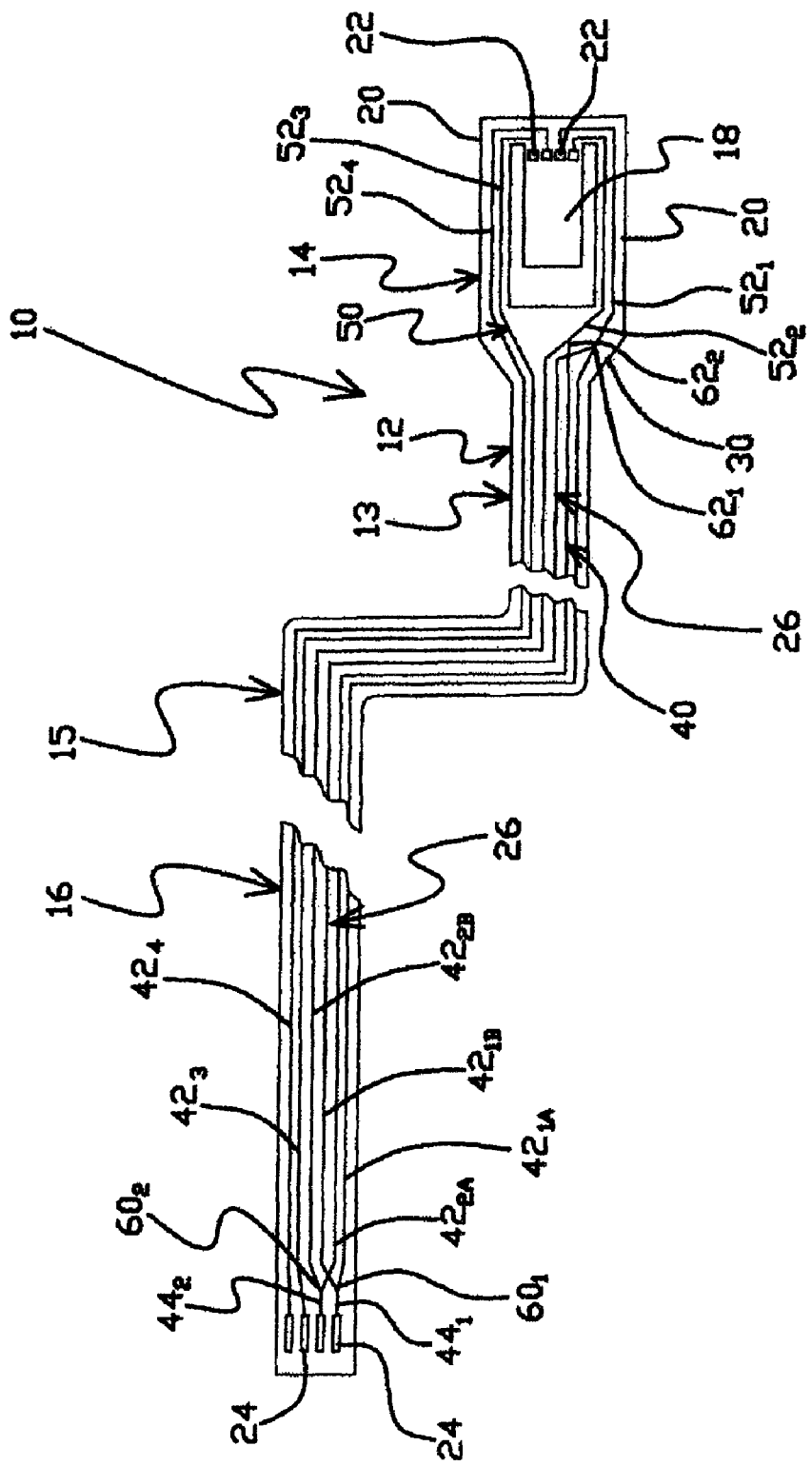
FIG. 1 is a plan view schematic illustration of an integrated lead flexure having interleaved first configuration traces on the tail and ground plane second configuration traces on the gimbal in accordance with a first embodiment of the invention.

FIG. 1 is a schematic illustration of a wireless or integrated lead flexure 10 having multiple configurations of leads or traces 26 in accordance with a first embodiment of the present invention. As shown, flexure 10 includes a main body region 12, spring-traversing region 13, gimbal 14, tail bend region 15 and a tail 16. Gimbal 14 includes a slider mounting member 18 supported from the main body region 12 by a pair of spring arms 20. The traces 26 electrically interconnect head bond pads 22 on the gimbal 14 to preamplifier terminal pads 24 on the proximal end of tail 16. The slider mounting member 18 and spring arms 20 of gimbal 14, along with other portions of the gimbal and at least portions of the bases of the main body region 12, spring-traversing region 13 and tail 16, include a stainless steel or other spring metal layer 30. Traces 26, bond pads 22 and terminal pads 24 can be formed from one or more layers of conductive material such as copper, nickel, gold and/or alloys. A polyimide or other dielectric insulating layer (not visible in FIG. 1) separates the traces 26, bond pads 22 and terminal pads 24 from the adjacent portions of the spring metal layer 30. Although the embodiment of the invention shown in FIG. 1 has four bond pads 22, terminal pads 24 and associated traces 26, other embodiments of the invention (not shown) have greater numbers of bond pads, terminal pads and traces.

Flexure 10 is a component that is assembled with other components (not shown) into a head suspension assembly. The main body region 12 of the flexure 10 will typically be welded or otherwise mounted to a rigid beam, with the gimbal 14 extending from the distal end of the rigid beam and the spring-traversing region 13 extending over or around a spring or hinge region. A read/write head is mounted to the slider mounting member 18 of the gimbal 14 and electrically connected to the bond pads 22. Terminal pads 24 are electrically connected to a preamplifier or other electrical component (not shown) of a disk drive into which the head suspension assembly is incorporated. Flexure 10 can be bent or folded at the tail bend region 15 to orient the terminal pads 24 in a plane suitable for connection to the preamplifier.

Traces 26 include first configuration trace sections 40 on the main body region 12, spring-traversing region 13 and tail 16, and second configuration trace sections 50 on the gimbal 14. In the embodiment shown in FIG. 1 the first trace sections 40 include two sets of interleaved traces $42_{1A}$, $42_{1B}$ and $42_{2A}$, $42_{2B}$, and two single traces $42_3$ and $42_4$. The second trace sections 50 include two ground plane traces $52_1$ and $52_2$ and two single traces $52_3$ and $52_4$. Proximal ends of the interleaved traces $42_{1A}$, $42_{1B}$ and $42_{2A}$, $42_{2B}$ are connected to respective terminal pads 24 by transition structures $60_1$ and $60_2$ and traces $44_1$ and $44_2$. The proximal ends of single traces $42_3$ and $42_4$ are connected directly to the associated terminal pads 24. Distal ends of the interleaved traces $42_{1A}$, $42_{1B}$ and $42_{2A}$, $42_{2B}$, are connected to the proximal ends of associated ground plane traces $52_1$ and $52_2$ by transition structures $62_1$ and $62_2$. The distal ends of single traces $42_3$ and $42_4$ are connected directly to the proximal ends of the associated single traces $52_3$ and $52_4$. The distal ends of the ground plane traces $52_1$ and $52_2$ and single traces $52_3$ and $52_4$ are connected directly to the associated bond pads 22.

Figure 2:
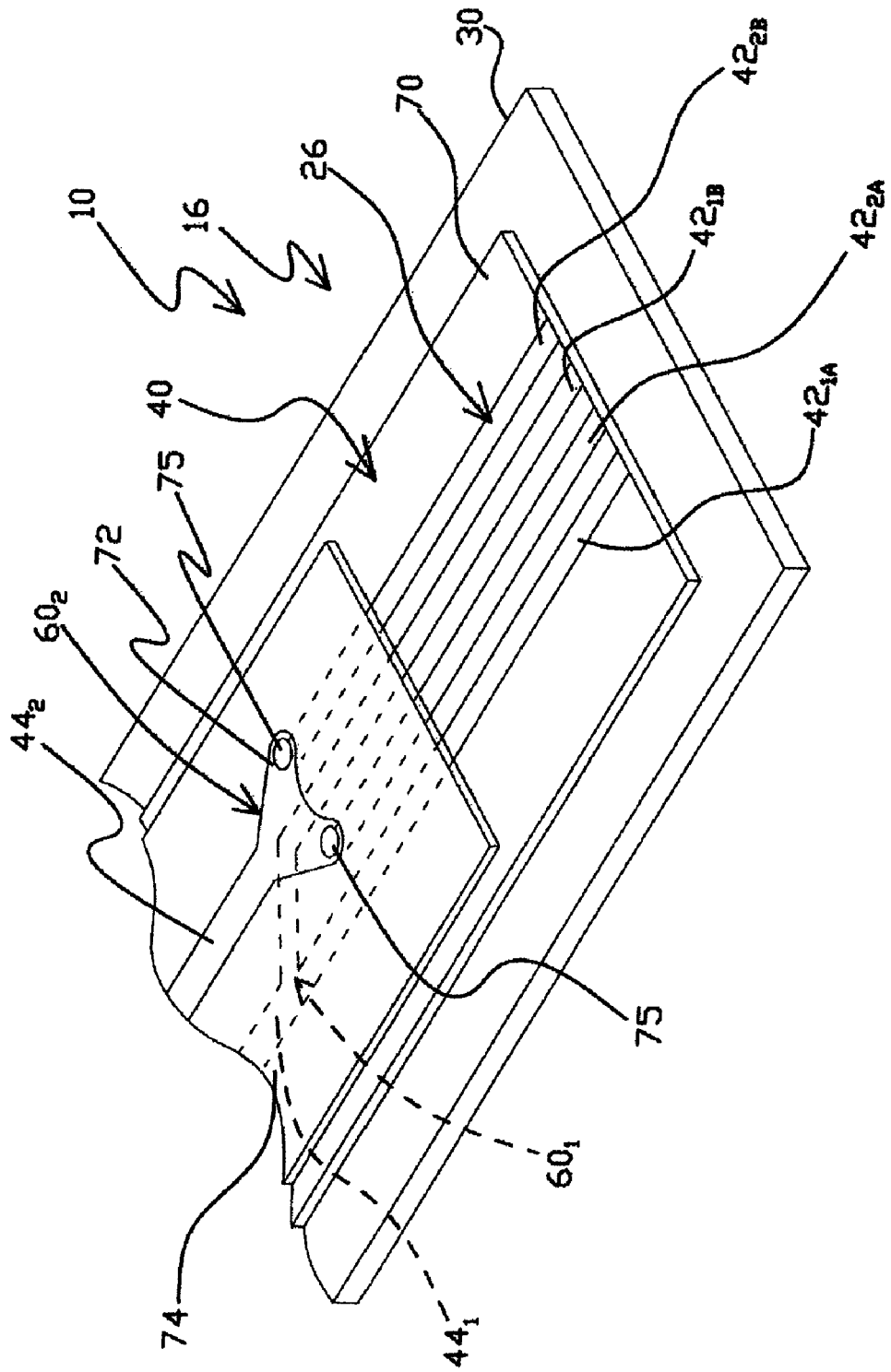
FIG. 2 is a detailed isometric schematic illustration of one embodiment of the transition structures between the interleaved traces and the traces connected to the terminal pads of the flexure shown in FIG. 1.

FIG. 2 is a detailed illustration of the portion of flexure 10 adjacent the transition structures $60_1$ and $60_2$ on the tail 16. As shown, interleaved traces $42_{1A}$, $42_{1B}$ and $42_{2A}$, $42_{2B}$ are located on a surface of a first insulating layer 70 opposite the spring metal layer 30. Transition structure $60_1$ is an intersection of the interleaved traces $42_{1A}$ and $42_{1B}$ on the insulating layer 70. Transition structure $60_2$ includes a conductive jumper 72 on a surface of a second insulating layer 74 opposite the interleaved traces $42_{1A}$, $42_{1B}$ and $42_{2A}$, $42_{2B}$, and conductive vias 75 extending through the second insulating layer to electrically connect the interleaved traces $42_{2A}$ and $42_{2B}$ to the jumper. Conductive jumper 72 is connected to an associated terminal pad 24 by trace $44_2$ on the same surface of the second insulating layer 74 as the jumper. Trace $44_1$ is on the surface of the first insulating layer 70 between the first insulating layer and the second insulating layer 74, and can be connected to an associated terminal pad 24 by structures such as those described below.

Figure 3:
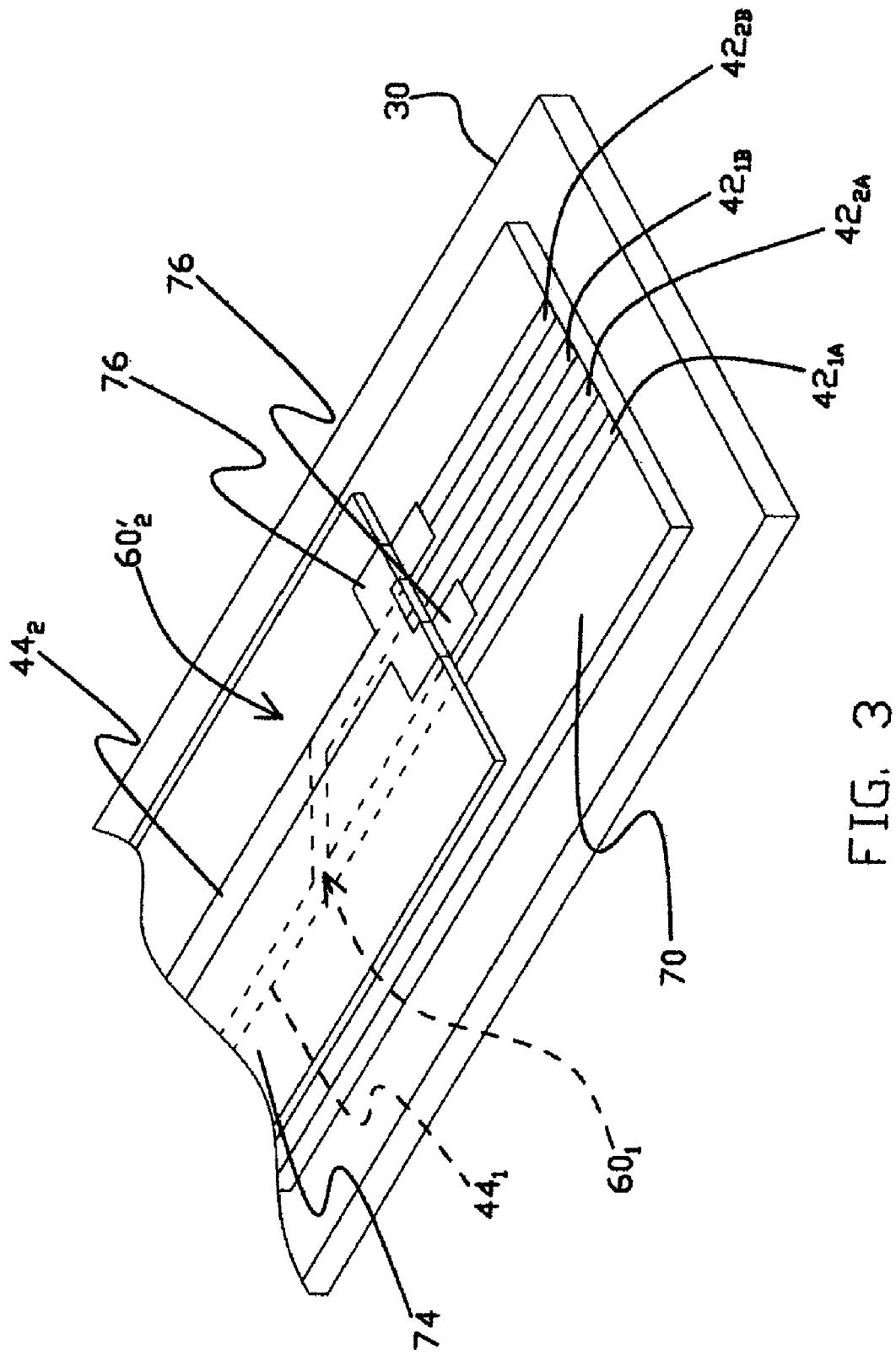
FIG. 3 is a detailed isometric schematic illustration of an alternative embodiment of the transition structure between the interleaved traces and the traces connected to the terminal pads of the flexure shown in FIG. 1.

FIG. 3 is a detailed illustration of an alternative transition structure $60_2$' that can be used to connect interleaved traces $42_{2A}$ and $42_{2B}$ to trace $44_2$. As shown, transition structure $60_2$' includes a pair of spaced-apart conductive legs 76 that branch from trace $44_2$, extend over an edge of the second insulating layer 74, and into overlapping and electrical contact with the proximal ends of interleaved traces $42_{2A}$ and $42_{2B}$. The transition structure $60_2$' can be formed during separate manufacturing steps to extend over the edge of the second insulating layer 74 and into overlapping electrical contact with the previously formed traces $42_{2A}$, $42_{2B}$ or trace $44_2$. Alternatively, the transition structure $60_2$' can be formed simultaneously with the formation of the traces $42_{2A}$, $42_{2B}$ or $44_2$.

Transition structures between other sets of trace configurations can also include plating layers such as that of $60_2$' described in connection with FIG. 3. For example, the transition between stacked traces (e.g., traces 153 and $153_2$ in FIG. 6) and ground plane or micro strip traces (e.g., traces $52_1$ and $52_2$ in FIG. 4) can include a section of conductive plating that extends over an edge of an insulating layer to connect a trace section extending from the top of the insulating layer edge to a trace section extending from the bottom of the insulating layer edge.

Figure 10A:
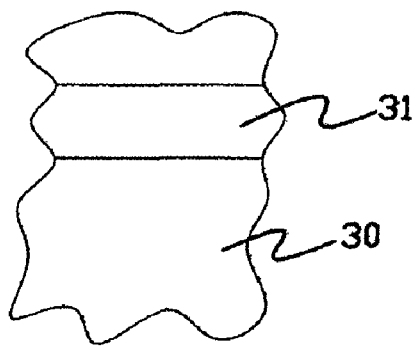
FIGS. 10A-10E are detailed illustrations of the portion of the flexure shown in FIG. 1 having the terminal pads and traces connected to the interleaved traces, showing the flexure portion during a sequence of manufacturing steps.
Figure 10B:
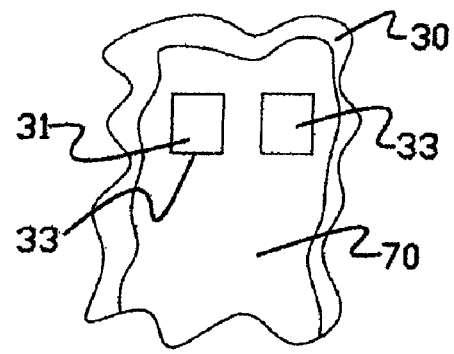
Figure 10C:
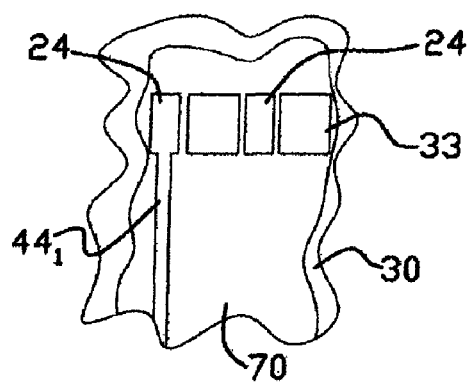
Figure 10D:
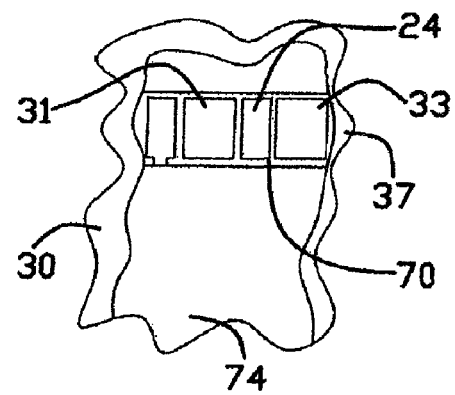
Figure 10E:
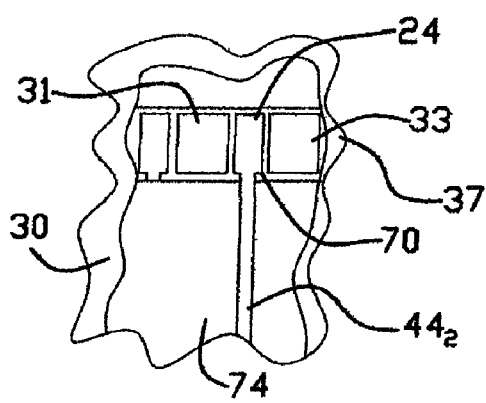

FIGS. 10A-10E are detailed illustrations of the portion of flexure 10 adjacent to traces $44_1$ and $44_2$ and associated terminal pads 24, with the flexure portion shown at each of a sequence of manufacturing steps. The double plated manufacturing process and structure shown in FIGS. 10A-10E produces terminal pads 24 that are at the same height, even though the traces $44_1$ and $44_2$ that the terminal pads are connected to are at different levels or heights with respect to the spring metal layer 30. FIG. 10A shows the spring metal layer 30 with an aperture 31 at the locations where the terminal pads 24 will be formed. FIG. 10B shows the first insulating layer 70 over the spring metal layer 30 and aperture 31, with a pair of spaced apertures 33 in the insulating layer over the aperture in the spring metal layer. A first conductor layer is then applied to form trace $44_1$ and a first layer of the bond pads 24 as shown in FIG. 10C. The second insulating layer 74 is then applied over the first insulating layer 70 and trace $44_1$ as shown in FIG. 10D. An opening 37 is formed in the second insulating layer 74 to expose the apertures 31 and 33 and the first layer of bond pads 24. As shown in FIG. 10E, a second conductor layer is then applied to form a second layer of the terminal pads 24 and the trace $44_2$. Other processes and structures (not shown), such as vias, can be used to connect trace $44_1$ to the associated terminal pad 24, and to make the terminal pads at the same height, in other embodiments of the invention.

Figure 4:
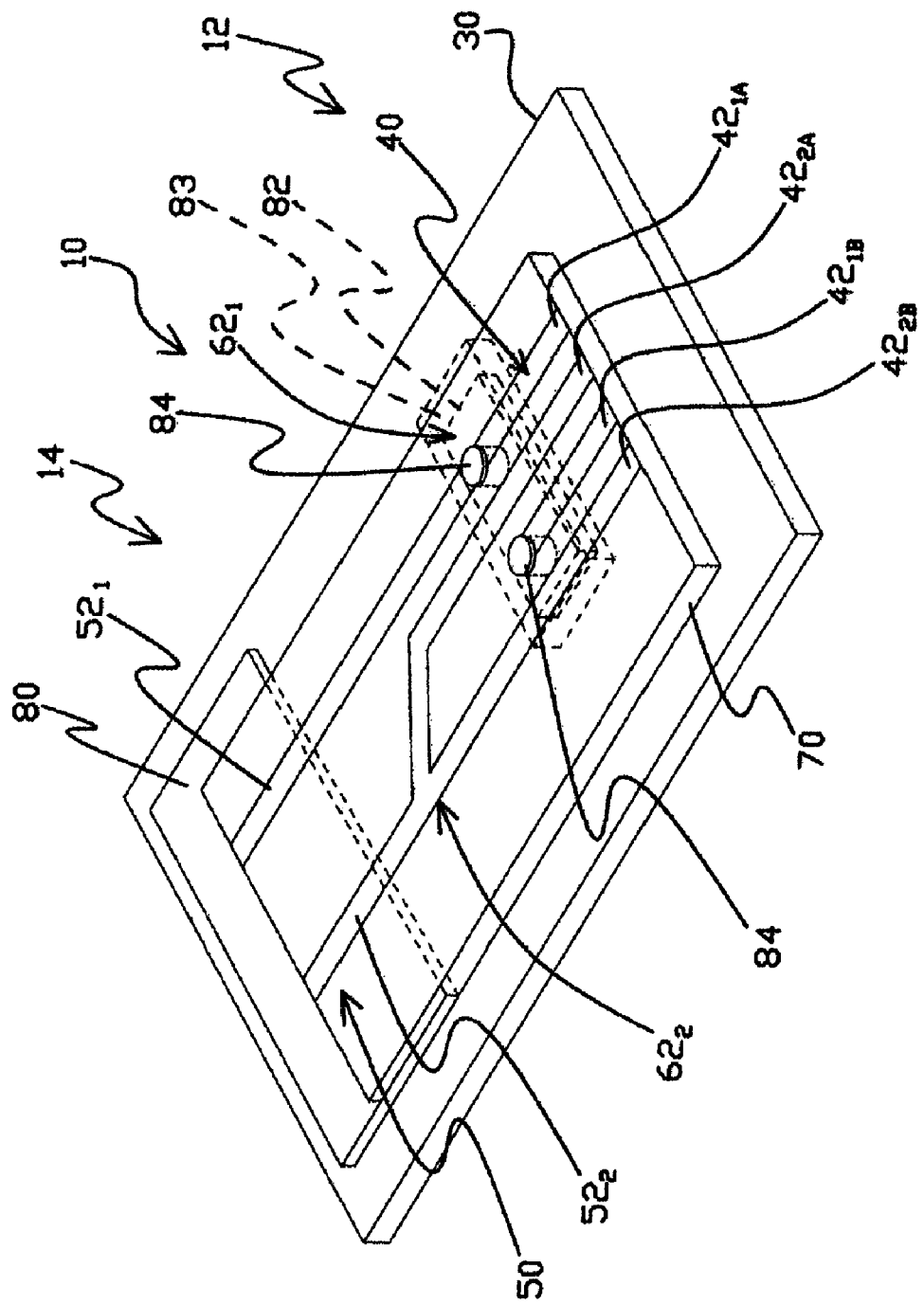
FIG. 4 is a detailed isometric schematic illustration of one embodiment of the transition structures between the interleaved traces and the ground plane traces of the flexure shown in FIG. 1.

FIG. 4 is a detailed illustration of the portion of flexure 10 adjacent the transition structures $62_1$ and $62_2$ near the intersection of the gimbal 14 and main body region 12. The ground plane traces $52_1$ and $52_2$, which are similar in structure to conventional micro strip conductors, are traces that are backed by an electrically conductive layer. In the embodiment shown in FIG. 4, the ground plane traces $52_1$ and $52_2$ are backed by a conductive ground plane layer 80 formed on the spring metal layer 30. Traces $52_1$ and $52_2$ are formed on the surface of a first insulating layer 70 that separates the traces from the ground plane layer 80. Other embodiments of the ground plane traces $52_1$ and $52_2$ (not shown) are backed by the spring metal layer and do not have an additional ground plane layer such as 80.

Transition structure $62_2$ is an intersection of the interleaved traces $42_{2A}$ and $42_{2B}$ on the insulating layer 70. Transition structure $62_1$ includes a spring metal island 82 in the spring metal layer 30 below the interleaved traces $42_{1A}$, $42_{1B}$ and $42_{2A}$, $42_{2B}$, and conductive vias 84 extending through the insulating layer 70 to electrically connect the interleaved traces $42_{1A}$ and $42_{1B}$ to the spring metal island 82. The spring metal island 82 is separated and electrically isolated from adjacent portions of the spring metal layer 30 by space 83, and electrically interconnects the interleaved traces $42_{1A}$ and $42_{1B}$ through vias 84.

The thickness, width, spacing between and/or other features of the interleaved traces $42_{1A}$, $42_{1B}$ and $42_{2A}$, $42_{2B}$ can be varied to vary the impedance of the traces along their lengths. Similarly, features of the ground plane traces $52_1$ and $52_2$ (e.g., width, spacing, insulating layer thickness and dielectric constant) can be varied to change the impedance of the traces along their lengths. In one embodiment of the invention, for example, first trace sections 40 and the second trace sections 50 are impedance matched and configured so their impedances continuously vary between a first impedance at the terminal pads 24 (e.g., about 65 ohms) that substantially matches the impedance of the disk drive circuitry to which the terminal pads are connected, and a second impedance at the bond pads 22 (e.g., about 15 ohms) that substantially matches the impedance of the read/write head mounted to the slider mounting member 18. Trace structures capable of providing variable impedance features are disclosed, for example, in the following commonly assigned U.S. patent applications: Ser. No. 11/744,623, filed May 4, 2007, entitled Integrated Lead Head Suspension With Tapered Trace Spacing; Ser. No. 11/744,644, filed May 4, 2007, entitled Disk Drive Head Suspension Flexures Having Alternating Width Stacked Leads; and provisional application Ser. No. 60/991,165, filed Oct. 9, 2007, entitled Constant Impedance and Variable Bandwidth Traces For An Integrated Lead Suspension. Other transition structures can also be used in the flexure 10, including for example those shown in commonly assigned U.S. provisional application Ser. No. 60/916,201, filed May 4, 2007, entitled Trace Jumpers For Disk Drive Suspensions. Conventional or otherwise known photolithography, deposition and etching process such as those disclosed, for example, in the Swanson U.S. published patent application no. 2005/0254175, can be used to manufacture flexure 10. All of the above-mentioned patent applications are incorporated herein in their entirety by reference.

In one embodiment of the invention the interleaved traces $42_{1A}$, $42_{1B}$ and $42_{2A}$, $42_{2B}$ can have a width foot print of about 300 µm and a 65 ohm impedance. Other embodiments of the invention have interleaved traces with foot prints between about 100 µm and 600 µm. The ground plane traces can provide an impedance of about 15-25 ohms. These examples are non-limiting. Larger and/or smaller footprints and impedances can be used in other embodiments.

Integrated lead flexure 10 offers a number of important advantages. The interleaved first trace sections 40 can provide desirable electrical characteristics such as the high bandwidth and mid range impedance values suitable for impedance matching to disk drive circuits connected to the terminal pads 24 on the tail 16. The ground plane second trace sections 50 can be made relatively narrow and thin to provide relatively low stiffness and small footprint mechanical characteristics desirable on the gimbal 14 of the flexure 10. The relatively low impedance of the ground plane second trace sections 50 is suitable for impedance matching to the read write heads connected to bond pads 22 on the gimbal. The varying features of the traces 26, especially the first trace sections 40, enables the continuous impedance matching transition between the impedances at the bond pads 22 and termination pads 24 to further enhance the electrical characteristics of the flexure 10.

The invention enables electrical performance to be maximized while still maintaining mechanical performance in mechanically critical areas. The location of the transition between different trace configurations can be chosen to optimize the balance between electrical and mechanical performances. Although the transition between the trace configurations is located between the main body region 12 and gimbal 14 in flexure 10, the transition is located at other mechanically critical locations in other embodiments (not shown) such as the spring-traversing region 13 and the tail bend region 15. The electrical performance of traces at these regions can then be optimized without substantially sacrificing the mechanical performance in mechanically critical areas. Similarly, trace structures that optimize electrical performance can be incorporated into non-mechanically critical areas of the flexure.

Figure 5:
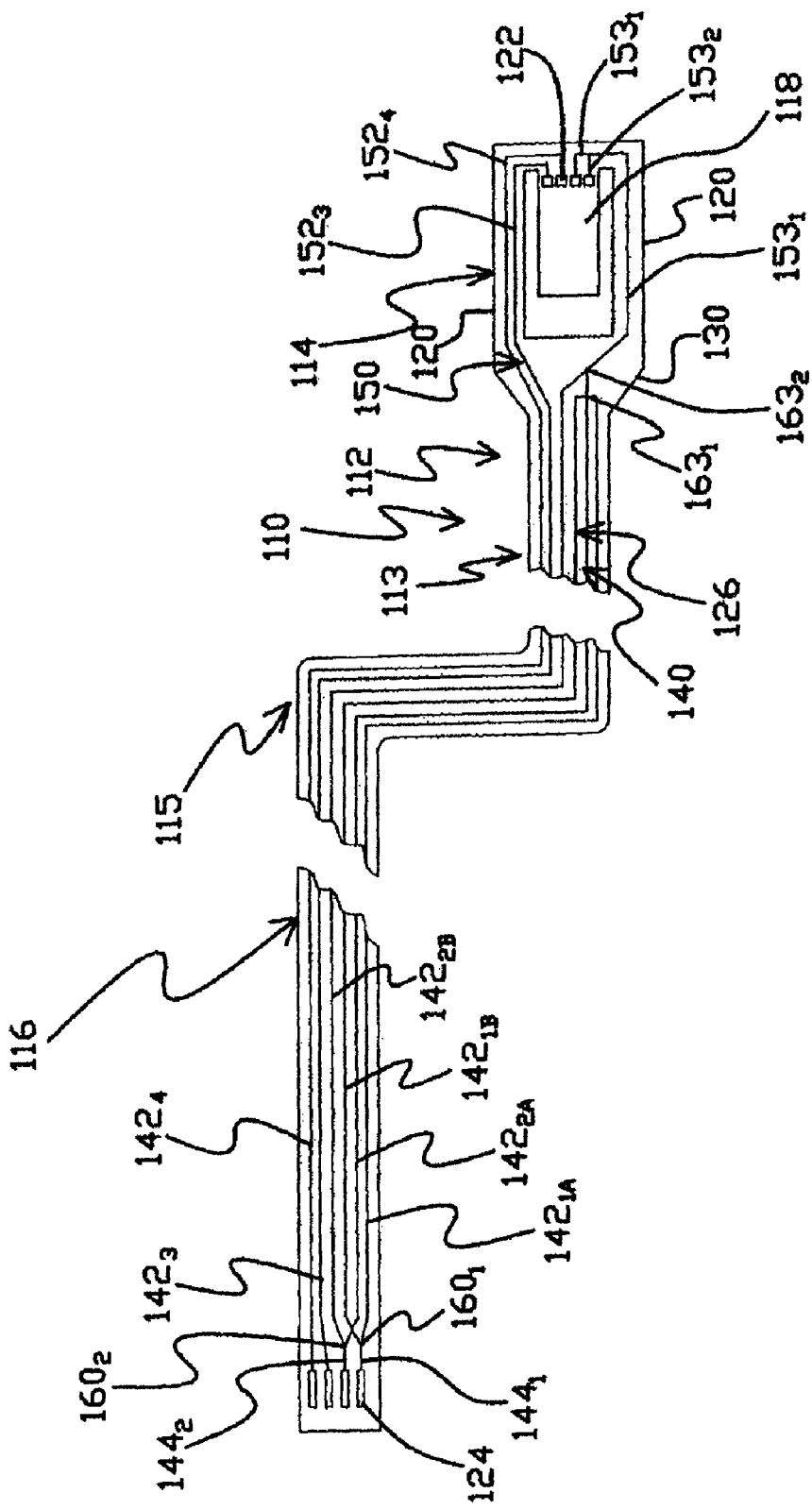
FIG. 5 is a plan view schematic illustration of an integrated lead flexure having interleaved first configuration traces and stacked second configuration traces in accordance with a second embodiment of the invention.

FIG. 5 is a schematic illustration of a wireless or integrated lead flexure 110 having multiple configurations of traces 126 in accordance with a second embodiment of the invention. As shown, flexure 110 includes a main body region 112, spring-traversing region 113, gimbal 114, tail bend region 115 and a tail 116. Gimbal 114 includes a slider mounting member 118 supported from the main body region 112 by a pair of spring arms 120. The traces 126 electrically interconnect head bond pads 122 on the gimbal 114 to preamplifier terminal pads 124 on the proximal end of tail 116. The slider mounting member 118 and spring arms 120 of gimbal 114, along with other portions of the gimbal and the base of main body region 112 and tail 116, include a stainless steel or other spring metal layer 130. Traces 126, bond pads 122 and terminal pads 124 can be formed from one or more layers of conductive material such as copper, nickel, gold and/or alloys. A polyimide or other dielectric insulating layer (not visible in FIG. 5) separates the traces 126, bond pads 122 and terminal pads 124 from the adjacent portions of the spring metal layer 130. Although the embodiment of the invention shown in FIG. 5 has four bond pads 122, terminal pads 124 and associated traces 126, other embodiments of the invention (not shown) have greater numbers of bond pads, terminal pads and traces.

Traces 126 include first configuration trace sections 140 on the main body region 112, spring-traversing region 113 and tail 116, and second configuration trace sections 150 on the gimbal 114. In the embodiment shown in FIG. 5 the first trace sections 140 include two sets of interleaved traces $142_{1A}$, $142_{1B}$ and $142_{2A}$, $142_{2B}$, and two single traces $142_3$ and $142_4$. The second trace sections 150 include two stacked traces $153_1$ and $153_2$ and two single traces $152_3$ and $152_4$. Proximal ends of the interleaved traces $142_{1A}$, $142_{1B}$ and $142_{2A}$, $142_{2B}$ are connected to respective terminal pads 124 by transition structures $160_1$ and $160_2$ and traces $144_1$ and $144_2$ (e.g., using double plated structures such as those described above in connection with FIGS. 10A-10E). The proximal ends of single traces $142_3$ and $142_4$ are connected directly to the associated terminal pads 124. Distal ends of the interleaved traces $142_{1A}$, $142_{1B}$ and $142_{2A}$, $142_{2B}$ are connected to the proximal ends of associated stacked traces $153_1$ and $153_2$ by transition structures $163_1$ and $163_2$. The distal ends of single traces $142_3$ and $142_4$ are connected directly to the proximal ends of the associated single traces $152_3$ and $152_4$. The distal ends of the single traces $152_3$ and $152_4$ are connected directly to the associated bond pads 122. The stacked traces $153_1$ and $153_2$ can be connected to bond pads 122 by structures similar to those of the double plated structures described above in connection with FIGS. 10A-10E or other structures such as vias (not shown). With the exception of stacked traces $153_1$ and $153_2$ and transition structures $163_1$ and $163_2$ which are described below, flexure 110 can be substantially the same as or similar to flexure 10 described above, and similar features are identified by similar reference numbers. Flexure 110 can also be manufactured using processes substantially the same as or similar to those described above in connection with flexure 10.

Figure 6:
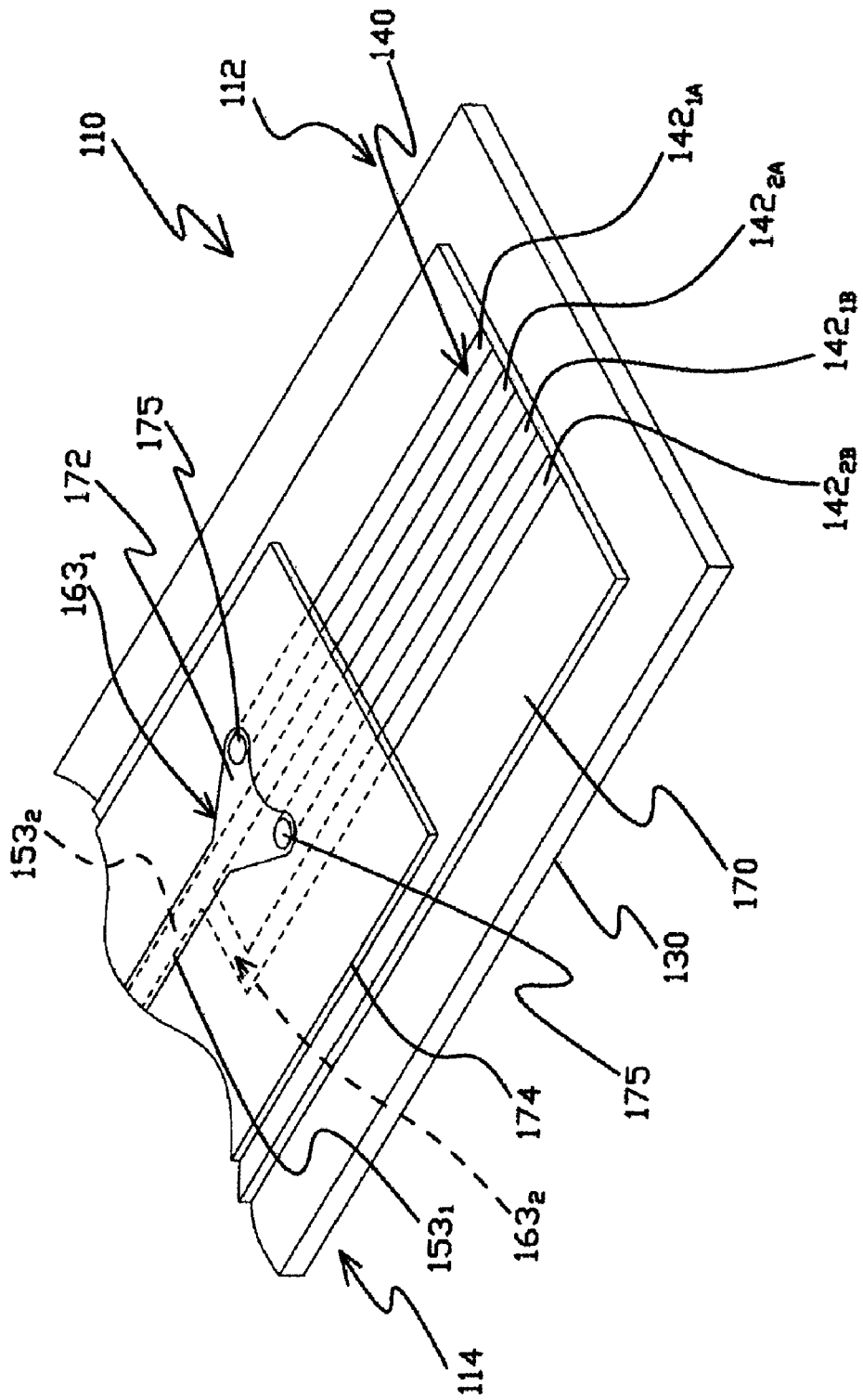
FIG. 6 is a detailed isometric schematic illustration of one embodiment of the transition structures between the interleaved traces and the stacked traces of the flexure shown in FIG. 5.

FIG. 6 is a detailed illustration of the portion of flexure 110 adjacent the transition structures $163_1$ and $163_2$. As shown, interleaved traces $142_{1A}$, $142_{1B}$ and $142_{2A}$, $142_{2B}$ are located on a surface of a first insulating layer 170 opposite the spring metal layer 130. Transition structure $163_2$ is an intersection of the interleaved traces $142_{2A}$ and $142_{2B}$ on the insulating layer 170. Transition structure $163_1$ includes a conductive jumper 172 on a surface of a second insulating layer 174 opposite the interleaved traces $142_{1A}$, $142_{1B}$ and $142_{2A}$, $142_{2B}$, and conductive vias 175 extending through the second insulating layer to electrically connect the interleaved traces $142_{1A}$ and $142_{1B}$ to the jumper. Conductive jumper 172 is connected to an associated bond pad 122 by stacked trace $153_1$ on the same surface of the second insulating layer 174 as the jumper. Stacked trace $153_2$ is on the surface of the first insulating layer 170, opposite the second insulating layer 174 from stacked trace $153_1$. As noted above, stacked trace $153_2$ can be electrically connected to an associated bond pad 122 by the double plated structures described in connection with FIGS. 10A-10E. Other embodiments of the invention (not shown) include alternative transition structures such as those described above in connection with flexure 10.

In one embodiment of flexure 110 the interleaved traces $142_{1A}$, $142_{1B}$ and $142_{2A}$, $142_{2B}$ are each about 30 μm wide and together have a maximum foot print of about 300 μm. The interleaved traces $142_{1A}$, $142_{1B}$ and $142_{2A}$, $142_{2B}$ have an impedance of about 65 ohms at the terminal pads 124. Stacked traces $153_1$ and $153_2$ can be about 50 μm wide, separated by a polyimide insulating layer 174 about 5 μm thick, and have an impedance at bond pads 124 of about 15-25 ohms. Other embodiments of the invention include traces having larger and/or smaller width, foot prints, impedances, thicknesses and other features and characteristics.

Integrated lead flexure 110 offers a number of important advantages. The interleaved first trace sections 140 can provide desirable electrical characteristics such as the high bandwidth and mid range impedance values suitable for impedance matching to disk drive circuits connected to the terminal pads 124 on the tail 116. The stacked traces $153_1$ and $153_2$ can be made relatively narrow and thin to provide relatively low stiffness and small footprint mechanical characteristics desirable on the gimbal 114 of the flexure 110. The relatively low impedance of the stacked second trace sections 150 is suitable for impedance matching to the read write heads connected to bond pads 122 on the gimbal 114. The varying features of the traces 126, especially the first trace sections 140, enables a continuous impedance matching transition between the impedances at the bond pads 122 and termination pads 124 to further enhance the electrical characteristics of the flexure 110.

Figure 7:
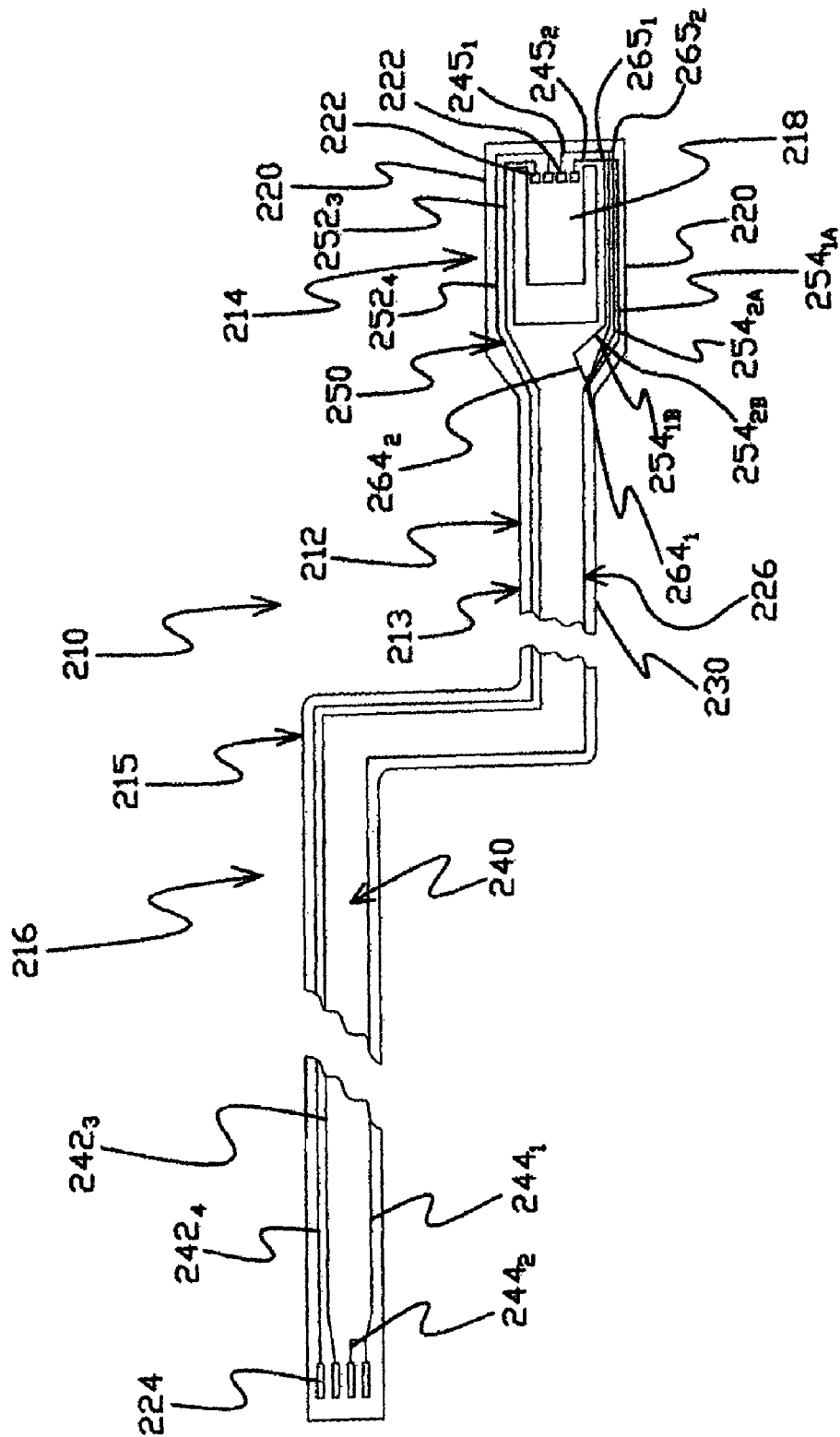
FIG. 7 is a plan view schematic illustration of an integrated lead flexure having stacked first configuration traces and interleaved second configuration traces in accordance with a third embodiment of the invention.

FIG. 7 is a schematic illustration of a wireless or integrated lead flexure 210 having multiple configurations of traces 226 in accordance with a third embodiment of the invention. As shown, flexure 210 includes a main body region 212, spring-traversing region 213, gimbal 214, tail bend region 215 and a tail 216. Gimbal 214 includes a slider mounting member 218 supported from the main body region 212 by a pair of spring arms 220. The traces 226 electrically interconnect head bond pads 222 on the gimbal 214 to preamplifier terminal pads 224 on the proximal end of tail 216. The slider mounting member 218 and spring arms 220 of gimbal 214, along with other portions of the gimbal and the base of main body region 212 and tail 216, are formed from a stainless steel or other spring metal layer 230. Traces 226, bond pads 222 and terminal pads 224 can be formed from one or more layers of conductive material such as copper, nickel, gold and/or alloys. A polyimide or other dielectric insulating layer (not visible in FIG. 7) separates the traces 226, bond pads 222 and terminal pads 224 from the adjacent portions of the spring metal layer 230. Although the embodiment of the invention shown in FIG. 7 has four bond pads 222, terminal pads 224 and associated traces 226, other embodiments of the invention (not shown) have greater numbers of bond pads, terminal pads and traces.

Traces 226 include first configuration trace sections 240 on the main body region 212, tail-traversing region 213 and tail 216, and second configuration trace sections 250 on the gimbal 214. In the embodiment shown in FIG. 7 the first trace sections 240 include two stacked traces $244_1$, and $244_2$ and two single traces $242_3$ and $242_4$. The second trace sections 250 include two sets of interleaved traces $254_{1A}$, $254_{1B}$ and $254_{2A}$, $254_{2B}$, and two single traces $252_3$ and $252_4$. Proximal ends of the stacked traces $244_1$, and $244_2$ are connected to respective terminal pads 224 by double plated structures such as those described above in connection with FIGS. 10A-10E or other structures (not shown). The proximal ends of single traces $242_3$ and $242_4$ are connected directly to the associated terminal pads 224. Distal ends of the stacked traces $244_1$ and $244_2$ are connected to the proximal ends of interleaved traces $254_{1A}$, $254_{1B}$ and $254_{2A}$, $254_{2B}$ by transition structures $264_1$ and $264_2$. The distal ends of the interleaved traces $254_{1A}$, $254_{1B}$ and $254_{2A}$, $254_{2B}$ are connected to respective bond pads 222 by transition structures $265_1$ and $265_2$, traces $245_1$ and $245_2$ and structures such as the double plated structures described above in connection with FIGS. 10A-10E. The distal ends of single traces $242_3$ and $242_4$ are connected directly to the proximal ends of the associated single traces $252_3$ and $252_4$. The distal ends of the single traces $252_3$ and $252_4$ are connected directly to the associated bond pads 222.

The stacked traces $244_1$ and $244_2$ can be the substantially the same as or similar to the stacked traces $153_1$ and $153_2$ described above in connection with flexure 110. The interleaved traces $254_{1A}$, $254_{1B}$ and $254_{2A}$, $254_{2B}$ can be substantially the same as or similar to the interleaved traces $42_{1A}$, $42_{1B}$ and $42_{2A}$, $42_{2B}$, of the flexure 10. The transition structures $264_1$ and $264_2$ between the stacked first trace sections 240 and the interleaved second trace sections 250 can be substantially the same as or similar to the transition structures $163_1$ and $163_2$ of flexure 110. Transition structures $265_1$ and $265_2$ between the interleaved second trace sections 250 and the traces $245_1$ and $245_2$ connected to the bond pads 222 can be substantially the same as or similar to the transition structures $60_1$ and $60_2$ of flexure 10. Flexure 210 can be manufactured using processes substantially the same as or similar to those described above in connection with flexure 10. Flexure 210 offers advantages similar to those described above in connection with flexures 10 and 110. In particular, flexure 210 allows optimal mechanical properties and maximizes electrical performance in areas other an the gimbal (e.g., in the tail bend and radius regions). These characteristics can, for example, be useful in flexures where characteristics of the tail, tail bend or spring-traversing regions are more critical than those of the gimbal.

Figure 8:
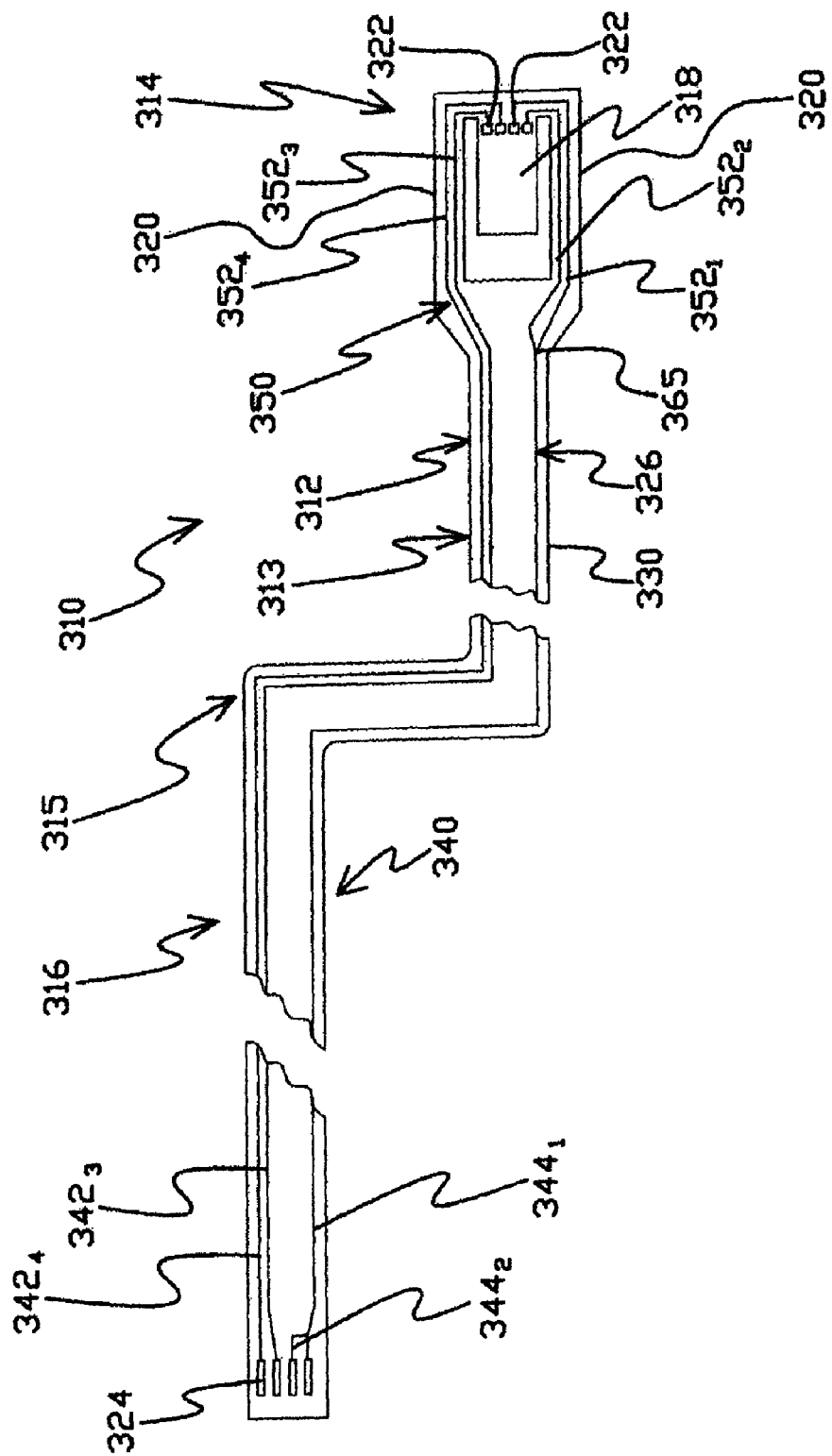
FIG. 8 is a plan view schematic illustration of an integrated lead flexure having stacked first configuration traces and ground plane second configuration traces in accordance with a fourth embodiment of the invention.

FIG. 8 is a schematic illustration of a wireless or integrated lead flexure 310 having multiple configurations of traces 326 in accordance with a fourth embodiment of the invention. As shown, flexure 310 includes a base or main body region 312, spring-traversing region 313, gimbal 314, tail bend region 315 and a tail 316. Gimbal 314 includes a slider mounting member 318 supported from the main body region 312 by a pair of spring arms 320. The traces 326 electrically interconnect head bond pads 322 on the gimbal 314 to preamplifier terminal pads 324 on the proximal end of tail 316. The slider mounting member 318 and spring arms 320 of gimbal 314, along with other portions of the gimbal and the base of main body region 312 and tail 316, are formed from a stainless steel or other spring metal layer 330. Traces 326, bond pads 322 and terminal pads 324 can be formed from one or more layers of conductive material such as copper, nickel, gold and/or alloys. A polyimide or other dielectric insulating layer (not visible in FIG. 8) separates the traces 326, bond pads 322 and terminal pads 324 from the adjacent portions of the spring metal layer 330. Although the embodiment of the invention shown in FIG. 8 has four bond pads 322, terminal pads 324 and associated traces 326, other embodiments of the invention (not shown) have greater numbers of bond pads, terminal pads and traces.

Traces 326 include first configuration trace sections 340 on the main body region 312 and tail 316 and second configuration trace sections 350 on the gimbal 314. In the embodiment shown in FIG. 8 the first trace sections 340 include two stacked traces $344_1$, and $344_2$ and two single traces $342_3$ and $342_4$. The second trace sections 350 include two ground plane traces $352_1$ and $352_2$, and two single traces $352_3$ and $352_4$. Proximal ends of the stacked traces $344_1$, and $344_2$ are connected to respective terminal pads 324 by structures such as the double plated structures described above in connection with FIGS. 10A-10E. The proximal ends of single traces $342_3$ and $342_4$ are connected directly to the associated terminal pads 324. Distal ends of the stacked traces $344_1$ and $344_2$ are connected to the proximal ends of ground plane traces $352_1$ and $352_2$ by transition structure 365. The distal ends of the ground plane traces $352_1$ and $352_2$ and single traces $352_3$ and $352_4$ are connected directly to respective bond pads 322. The distal ends of single traces $342_3$ and $342_4$ are connected directly to the proximal ends of the associated single traces $352_3$ and $352_4$.

Figure 9:
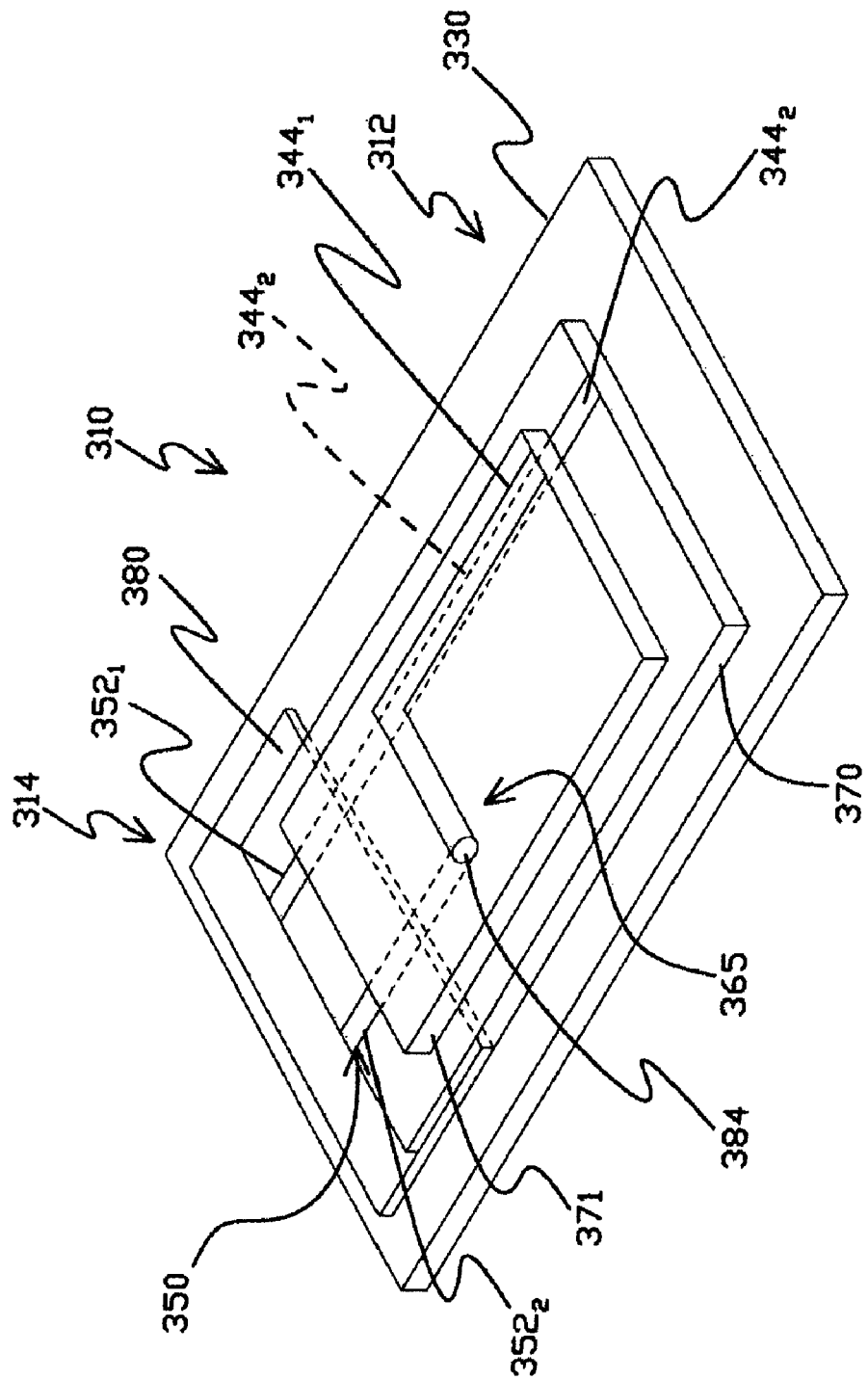
FIG. 9 is a detailed isometric schematic illustration of one embodiment of the transition structure between the stacked traces and the ground plane traces of the flexure shown in FIG. 8.

FIG. 9 is a detailed illustration of the portion of flexure 310 adjacent the transition structure 365 near the intersection of the gimbal 314 and main body region 312. As shown, ground plane traces $352_1$ and $352_2$ and stacked trace $344_2$ are on the surface of first insulating layer 370 opposite the spring metal layer 330. A conductive ground plane layer 380 is located on the spring metal layer 330, below the first insulating layer 370 and the ground plane traces $352_1$ and $352_2$, throughout all or at least a substantial portion of the second trace sections 350. In other embodiments (not shown) the spring metal layer 330 functions as the ground plane layer. Stacked trace $344_2$ extends directly from ground plane trace $352_1$ on the surface of the first insulating layer 370. A second insulating layer 371 extends over the ground plane traces $352_1$ and $352_2$ and the stacked trace $344_2$. Transition structure 365 includes a conductive via 384 extending through the insulating layer 370 to electrically connect the ground plane trace $352_2$ to the stacked trace $344_1$.

The stacked traces $344_1$ and $344_2$ can be the substantially the same as or similar to the stacked traces $153_1$ and $153_2$ described above in connection with flexure 110. The ground plane traces $352_1$ and $352_2$ can be substantially the same as or similar to the ground plane traces $52_1$ and $52_2$ of the flexure 10. Flexure 310 can be manufactured using processes substantially the same as or similar to those described above in connection with flexure 10.

Although the present invention has been described with reference to preferred embodiments, those skilled in the art will recognize that changes can be made in form and detail without departing from the spirit and scope of the invention. For example, although two different configurations of trace sections are shown in the illustrated examples, other embodiments (not shown) can have additional and/or different trace sections on portions of the tail, tail bend, mounting region, spring-traversing region and/or gimbal. Other trace configurations (e.g., single traces with no ground plane or windows in the stainless steel layer) can also be used, as can other combinations of these traces configurations.

What is claimed is:

1. An integrated lead head suspension flexure having a plurality of regions including a tail and a gimbal, including:
   first trace sections having a first structural configuration on a first region of the flexure, wherein the first trace sections have a first structural configuration from the set including interleaved traces, stacked traces and ground plane traces;
   second trace sections having a second structural configuration different than the first configuration on a second region of the flexure, the second trace sections electrically connected to the first trace sections and wherein the second trace sections have a second structural configuration from the set including interleaved traces, stacked traces and ground plane traces;
   one or more transition structures electrically connecting the first trace sections to the second trace sections;
   wherein at least one of the first and second trace sections include interleaved traces; and
   the transition structure to the interleaved traces includes a pair of plated conductive legs extending over an insulating layer edge.

2. The integrated lead head suspension flexure of claim 1 wherein the first and second trace sections are substantially impedance matched.

3. The integrated lead head suspension flexure of claim 2 and further including:
   bond pads on the gimbal having a first impedance; and
   terminal pads on the tail having a second impedance that is different than the first impedance, and wherein the first and second trace sections substantially impedance match the first and second impedances.

4. An integrated lead head suspension flexure having a plurality of regions including a tail and a gimbal, including:
   first trace sections having a first structural configuration on a first region of the flexure;
   second trace sections having a second structural configuration different than the first configuration on a second region of the flexure, the second trace sections electrically connected to the first trace sections;
   one or more transition structures electrically connecting the first trace sections to the second trace sections;
   wherein at least one of the first and second trace sections include interleaved traces; and
   the transition structure to the interleaved traces includes a pair of plated conductive legs extending over an insulating layer edge.

5. The integrated lead head suspension flexure of claim 4 wherein:
   the first trace sections include interleaved traces; and
   the second trace sections include stacked traces.

6. The integrated lead head suspension flexure of claim 4 wherein:
   the first trace sections include stacked traces; and
   the second trace sections include interleaved traces.

7. An integrated lead head suspension flexure having a plurality of regions including a tail and a gimbal, including:
   first trace sections having a first structural configuration on a first region of the flexure;
   second trace sections having a second structural configuration different than the first configuration on a second region of the flexure, the second trace sections electrically connected to the first trace sections;
   wherein the first trace sections include interleaved traces; and
   the second trace sections include ground plane traces.

8. An integrated lead head suspension flexure having a plurality of regions including a tail and a gimbal, including:
   first trace sections having a first structural configuration on a first region of the flexure;

second trace sections having a second structural configuration different than the first configuration on a second region of the flexure, the second trace sections electrically connected to the first trace sections;

wherein the first trace sections include stacked traces; and the second trace sections include ground plane traces.

9. An integrated lead head suspension flexure having a plurality of regions including a tail and a gimbal, including:
first trace sections having a first structural configuration on a first region of the flexure;
second trace sections having a second structural configuration different than the first configuration on a second region of the flexure, the second trace sections electrically connected to the first trace sections, wherein the first trace sections are substantially impedance matched to the second trace sections;
bond pads on the gimbal having a first impedance; and
terminal pads on the tail having a second impedance that is different than the first impedance, and wherein the first and second trace sections substantially impedance match the first and second impedances.

10. The integrated lead head suspension flexure of claim 9 and further including a transition structure electrically connecting the first trace sections to the second trace sections over an insulating layer edge.

11. An integrated lead head suspension flexure including:
a mounting region;
a gimbal extending distally from the mounting region and having bond pads;
a tail extending proximally from the mounting region and having terminal pads;
first trace sections having a first structural configuration electrically connected to the terminal pads and extending over at least a portion of the tail, wherein the first trace sections extend over substantially all of the tail and mounting region;
second trace sections having a second structural configuration different than the first structural configuration electrically connected to the bond pads and extending over at least a portion of the gimbal, wherein the second trace sections extend over substantially all of the gimbal; and
transition structures electrically connecting the first trace sections to the second trace sections, wherein the transition structures directly electrically connect the first and second trace sections;
wherein the first trace sections have a first structural configuration from the set including interleaved traces, stacked traces and ground plane traces; and
the second trace sections have a second structural configuration from the set including interleaved traces, stacked traces and ground plane traces.

12. The integrated lead head suspension flexure of claim 11 wherein:
at least one of the first and second trace sections include interleaved traces; and
the transition structure to the interleaved traces includes a pair of plated conductive legs extending over an insulating layer edge.

13. The integrated lead head suspension flexure of claim 12 wherein:
the first and second traces are substantially impedance matched; and
the flexure has a first impedance at the bond pads that is different than the second impedance at the terminal pads.

14. An integrated lead head suspension flexure including:
a mounting region;
a gimbal extending distally from the mounting region and having bond pads;
a tail extending proximally from the mounting region and having terminal pads;
first trace sections having a first structural configuration electrically connected to the terminal pads and extending over at least a portion of the tail;
second trace sections having a second structural configuration different than the first structural configuration electrically connected to the bond pads and extending over at least a portion of the gimbal; and
transition structures electrically connecting the first trace sections to the second trace sections;
wherein at least one of the first and second trace sections include interleaved traces; and
the transition structures includes a pair of plated conductive legs extending over an insulating layer edge.

15. An integrated lead head suspension flexure including:
a mounting region;
a gimbal extending distally from the mounting region and having bond pads;
a tail extending proximally from the mounting region and having terminal pads;
first trace sections having a first structural configuration electrically connected to the terminal pads and extending over at least a portion of the tail;
second trace sections having a second structural configuration different than the first structural configuration electrically connected to the bond pads and extending over at least a portion of the gimbal; and
transition structures electrically connecting the first trace sections to the second trace sections;
wherein the first and second traces are substantially impedance matched; and
the flexure has a first impedance at the bond pads that is different than the second impedance at the terminal pads.

16. The integrated lead head suspension flexure of claim 15 wherein:
at least one of the first and second trace sections include interleaved traces; and
the transition structures includes a pair of plated conductive legs extending over an insulating layer edge.

17. An integrated lead head suspension flexure including:
a mounting region;
a gimbal extending distally from the mounting region and having bond pads;
a tail extending proximally from the mounting region and having terminal pads;
first trace sections having a first structural configuration electrically connected to the terminal pads and extending over at least a portion of the tail;
second trace sections having a second structural configuration different than the first structural configuration electrically connected to the bond pads and extending over at least a portion of the gimbal; and
transition structures electrically connecting the first trace sections to the second trace sections; and
wherein the transition structure includes a plating layer extending over an insulating layer edge.

* * * * *